(12) United States Patent
Heitz et al.

(10) Patent No.: US 8,046,299 B2
(45) Date of Patent: Oct. 25, 2011

(54) SYSTEMS, METHODS, AND DEVICES FOR SELLING TRANSACTION ACCOUNTS

(75) Inventors: Rachel Heitz, West Jordan, UT (US);
Stephen Howland, Sandy, UT (US);
Dave Lamb, West Jordan, UT (US);
Jeffrey Peterson, Centerville, UT (US);
Caroline Philpott, New York, NY (US);
John Rose, Layton, UT (US); Scott Scovel, Jersey City, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 1221 days.

(21) Appl. No.: 10/707,779

(22) Filed: Jan. 12, 2004

(65) Prior Publication Data

US 2005/0154670 A1    Jul. 14, 2005

Related U.S. Application Data

(60) Provisional application No. 60/511,495, filed on Oct. 15, 2003.

(51) Int. Cl.
*G06Q 40/00*    (2006.01)
(52) U.S. Cl. ........................................ 705/39
(58) Field of Classification Search ............... 705/38–41
See application file for complete search history.

(56) References Cited

U.S. PATENT DOCUMENTS

| | | | |
|---|---|---|---|
| 127,747 A | 6/1872 | Donnelly |
| 174,590 A | 3/1876 | Tesseyman |
| 227,319 A | 5/1880 | Tegnander |
| 344,593 A | 6/1886 | Peabody |
| 349,775 A | 6/1886 | Wood |
| 367,029 A | 7/1887 | Esty |
| 571,129 A | 11/1896 | Schumacher |
| 574,762 A | 1/1897 | Rowbotham |
| 593,248 A | 11/1897 | Smith |
| 600,971 A | 3/1898 | Singer |
| 657,409 A | 9/1900 | Gould |
| 669,234 A | 3/1901 | Fuhrmann et al. |
| 697,649 A | 4/1902 | McLean |
| 706,320 A | 8/1902 | Jenney |
| 706,494 A | 8/1902 | Minogue |

(Continued)

OTHER PUBLICATIONS

"Visa International Launches Major Smart Card Program in Leading Shopping and Entertainment District in Tokyo" (PR Newswire, Jul. 15, 1998.*

(Continued)

*Primary Examiner* — Olabode Akintola
(74) *Attorney, Agent, or Firm* — Snell & Wilmer L.L.P.

(57) ABSTRACT

Systems and methods are configured to facilitate the distribution of transaction accounts through distributors. An exemplary method includes the steps of: issuing a transaction account to a distributor, receiving information from the distributor via the MICR protocol used by the banking and financial services industries, wherein the information reports the distribution of the transaction account, and processing the information via a Travelers Cheque infrastructure. The transaction account may be a pre-paid card and the distributor may be a seller of pre-paid cards. Distribution of the transaction account may be facilitated by use of a sequential number, such as a Travelers Cheque number. Thus, the system may be configured to be compatible with existing Travelers Cheque communication systems already in place. Furthermore, a financial transaction device may include a card that bears a serialized number, such as a Travelers Cheque number, in a manner that can be read by MICR technology.

10 Claims, 4 Drawing Sheets

U.S. PATENT DOCUMENTS

| | | |
|---|---|---|
| 749,864 A | 1/1904 | James |
| 766,410 A | 8/1904 | Alger |
| 771,037 A | 9/1904 | Beck |
| 782,597 A | 2/1905 | Chesire |
| 815,911 A | 3/1906 | Eddy |
| 818,609 A | 4/1906 | Butikofer |
| 839,300 A | 12/1906 | Krohn |
| 848,665 A | 4/1907 | Lombard |
| 850,295 A | 4/1907 | Chappell |
| 851,293 A | 4/1907 | Lehberger |
| 868,497 A | 10/1907 | Smith |
| 893,038 A | 7/1908 | Vadam |
| 893,181 A | 7/1908 | Macomber |
| 896,448 A | 8/1908 | Herndon |
| 897,963 A | 9/1908 | Clayton et al. |
| 945,232 A | 1/1909 | Harding |
| 928,715 A | 7/1909 | Thurber |
| 933,316 A | 9/1909 | Macomber |
| 947,008 A | 1/1910 | Williams et al. |
| 968,969 A | 8/1910 | Ord |
| 972,966 A | 10/1910 | Williams |
| 980,491 A | 1/1911 | Coleman |
| 998,363 A | 7/1911 | De Lukacsevics |
| 999,047 A | 7/1911 | Lehberger |
| 1,033,701 A | 7/1912 | Lochum |
| 1,038,537 A | 9/1912 | Dexter |
| 1,042,018 A | 10/1912 | Macomber |
| 1,050,456 A | 1/1913 | Helin |
| 1,053,799 A | 2/1913 | Eslick |
| 1,063,456 A | 6/1913 | Looney |
| 1,065,604 A | 6/1913 | Gray |
| 1,076,179 A | 10/1913 | Whitehead |
| 1,076,807 A | 10/1913 | Anderson |
| 1,080,123 A | 12/1913 | Pratt |
| 1,087,861 A | 2/1914 | Alexander et al. |
| 1,097,150 A | 5/1914 | Vallez |
| 1,104,539 A | 7/1914 | Ord |
| 1,132,161 A | 3/1915 | Cassady et al. |
| 1,132,581 A | 3/1915 | Hein |
| 1,136,363 A | 4/1915 | Pepper |
| 1,142,367 A | 6/1915 | Reiche |
| 1,147,313 A | 7/1915 | Desort |
| 1,170,918 A | 2/1916 | Lundy |
| 1,177,126 A | 3/1916 | Miller |
| 1,177,609 A | 4/1916 | Edwards |
| 1,181,463 A | 5/1916 | La Fontaine |
| 1,183,470 A | 5/1916 | Lee |
| 1,183,777 A | 5/1916 | Soules |
| 1,189,477 A | 7/1916 | Peytoureau |
| 1,202,598 A | 10/1916 | Simpson |
| 1,204,892 A | 11/1916 | Macomber |
| 1,206,800 A | 12/1916 | Batt |
| 1,207,846 A | 12/1916 | Bradford |
| 1,209,995 A | 12/1916 | Ord |
| 1,215,434 A | 2/1917 | Trebert |
| 1,219,377 A | 3/1917 | Davidson |
| 1,222,475 A | 4/1917 | Sears |
| 1,226,789 A | 5/1917 | Macomber |
| 1,228,101 A | 5/1917 | Dutton |
| 1,229,009 A | 6/1917 | Allison |
| 1,250,709 A | 12/1917 | Tanner |
| 1,256,382 A | 1/1918 | Hickey |
| 1,255,664 A | 2/1918 | Syger |
| 1,261,111 A | 4/1918 | Fasey et al. |
| 1,275,494 A | 8/1918 | Storle |
| 1,276,346 A | 8/1918 | Gould |
| 1,277,964 A | 9/1918 | Lovelace |
| 1,282,179 A | 10/1918 | Brackett |
| 1,282,180 A | 10/1918 | Brackett |
| 1,283,575 A | 11/1918 | Shepard |
| 1,289,424 A | 12/1918 | Faupel |
| 1,291,531 A | 1/1919 | James et al. |
| 1,293,733 A | 2/1919 | Duby |
| 1,298,191 A | 3/1919 | Fasey |
| 1,307,045 A | 6/1919 | Galbreath |
| 1,312,234 A | 8/1919 | Carlson |
| 1,313,569 A | 8/1919 | Wilks et al. |
| 1,316,679 A | 9/1919 | Brackett |
| 1,321,045 A | 11/1919 | Hutchinson |
| 1,321,046 A | 11/1919 | Hutchinson |
| 1,324,520 A | 12/1919 | Robbins |
| 1,324,534 A | 12/1919 | Ambrose |
| 1,328,261 A | 1/1920 | Blankenburg |
| 1,332,756 A | 3/1920 | Root |
| 1,332,948 A | 3/1920 | Murphy |
| 1,338,039 A | 4/1920 | Porter |
| 1,338,185 A | 4/1920 | Looney |
| 1,339,276 A | 5/1920 | Murphy |
| 1,345,808 A | 7/1920 | Reynolds |
| 1,345,940 A | 7/1920 | Looney |
| 1,347,762 A | 7/1920 | Shepard |
| 1,348,371 A | 8/1920 | Murphy |
| 1,364,256 A | 1/1921 | Des Engants et al. |
| 1,366,636 A | 1/1921 | Conway |
| 1,370,856 A | 3/1921 | Thomson |
| 1,374,315 A | 4/1921 | Murphy |
| 1,374,915 A | 4/1921 | Fasey |
| 1,375,140 A | 4/1921 | Fasey |
| 1,377,383 A | 5/1921 | Bair |
| 1,377,899 A | 5/1921 | De Lukacsevics et al. |
| 1,379,774 A | 5/1921 | Murphy |
| 1,379,775 A | 5/1921 | Murphy |
| 1,382,485 A | 6/1921 | Lukacsevics |
| 1,384,344 A | 7/1921 | Powell |
| 1,389,873 A | 9/1921 | Hult |
| 1,389,967 A | 9/1921 | Murphy |
| 1,390,034 A | 9/1921 | Howard |
| 1,393,174 A | 10/1921 | Shepard |
| 1,405,224 A | 1/1922 | Kenmonth |
| 1,407,293 A | 2/1922 | Mott |
| 1,408,385 A | 2/1922 | Newton |
| 1,413,363 A | 4/1922 | Smith et al. |
| 1,427,632 A | 8/1922 | Pryor |
| 1,445,686 A | 2/1923 | Hult |
| 1,466,144 A | 8/1923 | Murphy |
| 1,466,276 A | 8/1923 | Egersdorfer |
| 1,476,307 A | 12/1923 | Toth |
| 1,487,338 A | 3/1924 | Kelley |
| 1,492,215 A | 4/1924 | Nedoma |
| 1,503,741 A | 8/1924 | Almen |
| 1,508,623 A | 9/1924 | Somervell |
| 1,529,687 A | 3/1925 | Bowen |
| 1,544,382 A | 6/1925 | Entler |
| 1,545,925 A | 7/1925 | Powell |
| 1,549,556 A | 8/1925 | Kennedy |
| 1,556,300 A | 10/1925 | Olsen |
| 1,565,184 A | 12/1925 | Miller |
| 1,568,378 A | 1/1926 | Gribojedoff |
| 1,569,525 A | 1/1926 | Owens |
| 1,604,474 A | 10/1926 | Nisbet |
| 1,610,060 A | 12/1926 | Lind |
| 1,614,476 A | 1/1927 | Hutchinson |
| 1,622,986 A | 3/1927 | Weingartner |
| 1,625,841 A | 4/1927 | Wright |
| 1,628,100 A | 5/1927 | Bacon |
| 1,629,686 A | 5/1927 | Dreisbach |
| 1,655,738 A | 1/1928 | Rasck |
| 1,661,582 A | 3/1928 | Szydlowski |
| 1,664,086 A | 3/1928 | Olsen |
| 1,673,632 A | 6/1928 | Mattson |
| 1,675,629 A | 7/1928 | Andrews |
| 1,693,024 A | 11/1928 | Drummond |
| 1,696,676 A | 12/1928 | Fuhr |
| RE17,273 E | 4/1929 | Michell |
| 1,707,779 A | 4/1929 | Atkeson |
| 1,716,621 A | 6/1929 | Cizek |
| 1,717,999 A | 6/1929 | Olsen |
| 1,738,512 A | 12/1929 | Andrews |
| 1,788,140 A | 1/1930 | Woolson |
| 1,745,821 A | 2/1930 | Gribojedoff |
| 1,757,778 A | 5/1930 | Mehlum |
| 1,762,650 A | 6/1930 | Boughton |
| 1,770,311 A | 7/1930 | Keith |
| 1,772,531 A | 8/1930 | Williams |
| 1,772,977 A | 8/1930 | Arrighi |
| 1,774,713 A | 9/1930 | Jahn et al. |
| 1,779,032 A | 10/1930 | Cathcart |

| | | | | | | |
|---|---|---|---|---|---|---|
| 1,788,259 A | 1/1931 | Ward et al. | | 2,399,743 A | 5/1946 | Kahl |
| 1,793,107 A | 2/1931 | Livingston | | 2,401,466 A | 6/1946 | Davis et al. |
| 1,796,453 A | 3/1931 | Goehler | | 2,406,292 A | 8/1946 | Hall |
| 1,798,866 A | 3/1931 | Bleser | | 2,409,868 A | 10/1946 | Kahl |
| 1,799,772 A | 4/1931 | Wormley | | 2,417,487 A | 3/1947 | Hall |
| 1,804,598 A | 5/1931 | Earl | | 2,439,265 A | 4/1948 | Schroeder |
| 1,807,087 A | 5/1931 | Finke | | 2,444,764 A | 7/1948 | Baker |
| 1,808,083 A | 6/1931 | Tibbetts | | 2,447,314 A | 8/1948 | Carroll |
| 1,810,017 A | 6/1931 | Houston | | 2,456,164 A | 12/1948 | Youhouse |
| 1,813,259 A | 7/1931 | Schick | | 2,477,542 A | 7/1949 | Lane |
| 1,828,353 A | 10/1931 | Bleser | | 2,512,265 A | 6/1950 | Brigaudet |
| 1,838,974 A | 12/1931 | Williams | | 2,556,585 A | 6/1951 | Jarvinen |
| 1,839,592 A | 1/1932 | Reynolds | | 2,567,576 A | 9/1951 | Palumbo |
| 1,846,961 A | 2/1932 | Greening et al. | | 2,622,567 A | 12/1952 | Myard |
| 1,851,416 A | 3/1932 | Bauer | | 2,647,363 A | 8/1953 | Stott |
| 1,857,000 A | 5/1932 | Kleschka | | 2,650,676 A | 9/1953 | Jamotte |
| 1,864,248 A | 6/1932 | Holmes | | 2,664,866 A | 1/1954 | Fulke |
| 1,866,398 A | 7/1932 | Craig | | 2,767,589 A | 10/1956 | Redrup et al. |
| 1,867,504 A | 7/1932 | Franklin | | 2,770,140 A | 11/1956 | Palumbo |
| 1,871,973 A | 8/1932 | Finke | | 2,770,224 A | 11/1956 | Ericson |
| 1,886,492 A | 8/1932 | Mattson | | 2,776,649 A | 1/1957 | Fenske |
| 1,876,506 A | 9/1932 | Lee | | 2,781,749 A | 2/1957 | Stucke |
| 1,878,767 A | 9/1932 | Freund | | 2,783,751 A | 3/1957 | Karlan |
| 1,880,224 A | 10/1932 | Wilsey | | 2,856,781 A | 10/1958 | Forbes |
| 1,885,492 A | 11/1932 | Trew | | 2,875,701 A | 3/1959 | Ebert |
| 1,896,449 A | 2/1933 | Kreidler | | 2,949,100 A | 8/1960 | Peterson |
| 1,910,315 A | 5/1933 | Bleser | | 2,962,008 A | 11/1960 | Hopkins ......................... 123/45 |
| 1,918,840 A | 7/1933 | Eriksen | | 2,966,899 A | 1/1961 | Hermann ........................ 123/58 |
| 1,939,350 A | 12/1933 | Jendrassik ........................ 123/1 | | 2,994,188 A | 8/1961 | Howard ........................... 60/13 |
| 1,945,727 A | 2/1934 | Braunwalder ................. 123/58 | | 3,039,676 A | 6/1962 | Mikina ........................... 230/173 |
| 1,948,526 A | 2/1934 | Liles ............................. 121/119 | | 3,040,721 A | 6/1962 | Schotthoefer .................. 123/47 |
| 1,972,335 A | 9/1934 | Gardner ........................... 123/43 | | 3,068,709 A | 12/1962 | Peterson ........................... 74/57 |
| 1,973,887 A | 9/1934 | Schick ............................ 123/58 | | 3,078,832 A | 2/1963 | Braine ...................... 123/41.65 |
| 1,976,286 A | 10/1934 | Kreidler ............................ 74/57 | | 3,107,541 A | 10/1963 | Parsus ............................... 74/57 |
| 1,987,699 A | 1/1935 | Moore ............................... 60/41 | | 3,126,835 A | 3/1964 | Kline ............................ 103/162 |
| 1,988,252 A | 1/1935 | Pears ............................... 123/58 | | 3,169,514 A | 2/1965 | Girodin ........................... 123/58 |
| 1,999,451 A | 4/1935 | Finlay ............................... 74/56 | | 3,170,444 A | 2/1965 | Haddon ...................... 123/41.34 |
| 2,001,533 A | 5/1935 | Houston ......................... 123/58 | | 3,182,644 A | 5/1965 | Dritina ............................ 123/58 |
| 2,026,705 A | 1/1936 | Pratt ............................... 123/43 | | 3,202,141 A | 8/1965 | Lovell ................................ 123/1 |
| 2,027,891 A | 1/1936 | Weitzel ........................... 123/61 | | 3,306,269 A | 2/1967 | Dimmock, Jr. .................. 123/15 |
| 2,041,319 A | 5/1936 | Blomgren ....................... 123/58 | | 3,326,193 A | 6/1967 | Wahlmark ....................... 123/43 |
| 2,057,147 A | 10/1936 | Holmes ......................... 123/191 | | 3,333,577 A | 8/1967 | Mongitore ....................... 123/18 |
| 2,062,219 A | 11/1936 | Ginn ............................... 123/43 | | 3,359,864 A | 12/1967 | Hamlin ............................ 91/175 |
| 2,065,790 A | 12/1936 | Braunwalder ................. 123/58 | | 3,385,051 A | 5/1968 | Kelly ................................. 60/24 |
| 2,068,038 A | 1/1937 | Prothero et al. ............... 123/51 | | 3,396,709 A | 8/1968 | Robicheaux .................... 123/45 |
| 2,069,651 A | 2/1937 | Ferris ............................. 103/162 | | 3,403,668 A | 10/1968 | Schottler ....................... 123/197 |
| 2,076,334 A | 4/1937 | Burns ............................. 123/58 | | 3,407,593 A | 10/1968 | Kelly ................................. 60/24 |
| 2,083,510 A | 6/1937 | Stigers ............................. 74/56 | | 3,408,898 A | 11/1968 | Hamlin |
| 2,091,949 A | 7/1937 | Alfaro ........................... 123/196 | | 3,456,630 A | 7/1969 | Karlan ............................ 123/58 |
| 2,188,630 A | 10/1937 | Grahman ....................... 123/58 | | 3,570,463 A | 3/1971 | Nelson .......................... 123/122 |
| 2,099,983 A | 11/1937 | Lake ............................... 123/41 | | 3,587,538 A | 6/1971 | Poole ............................. 123/45 |
| 2,118,804 A | 5/1938 | Andersen ...................... 123/58 | | 3,598,094 A | 8/1971 | Odawara ....................... 123/58 |
| 2,121,706 A | 6/1938 | Little ................................. 123/7 | | 3,626,911 A | 12/1971 | Shaw .............................. 123/45 |
| 2,126,860 A | 8/1938 | Alfaro ............................. 123/51 | | 3,654,906 A | 4/1972 | Airas .............................. 123/45 |
| 2,155,455 A | 4/1939 | Thoma ........................... 103/162 | | 3,673,911 A | 7/1972 | Winn .............................. 123/58 |
| 2,201,893 A | 5/1940 | Gadoux et al. ............. 170/135.5 | | 3,687,117 A | 8/1972 | Panariti .......................... 123/43 |
| 2,205,953 A | 6/1940 | Hall ................................. 74/60 | | 3,695,237 A | 10/1972 | Londo ............................ 123/43 |
| 2,237,989 A | 4/1941 | Herrmann ..................... 123/58 | | 3,745,887 A | 7/1973 | Striegl ........................... 92/146 |
| 2,239,063 A | 4/1941 | Taylor et al. .................... 74/56 | | 3,745,981 A | 7/1973 | Warner .......................... 123/58 |
| 2,243,817 A | 5/1941 | Herrmann ..................... 123/58 | | 3,786,790 A | 1/1974 | Plevyak ......................... 123/58 |
| 2,243,820 A | 5/1941 | Herrmann ....................... 74/56 | | 3,805,749 A | 4/1974 | Karlan ........................... 123/58 |
| 2,243,821 A | 5/1941 | Herrmann ....................... 74/56 | | 3,807,370 A | 4/1974 | Baugh ........................... 123/43 |
| 2,243,822 A | 5/1941 | Herrmann ....................... 74/56 | | 3,828,741 A | 8/1974 | Bixier ............................ 123/58 |
| 2,250,512 A | 7/1941 | Vickers ............................ 184/6 | | 3,830,208 A | 8/1974 | Turner ........................... 123/43 |
| 2,269,106 A | 1/1942 | Hoffmann ..................... 123/58 | | 3,844,258 A | 10/1974 | Howell .......................... 123/43 |
| 2,272,691 A | 2/1942 | Chilton ............................ 74/56 | | 3,854,284 A | 12/1974 | Denker ...................... 60/39.61 |
| 2,274,097 A | 2/1942 | Sheerer ......................... 123/58 | | 3,895,614 A | 7/1975 | Bailey ............................ 123/67 |
| 2,276,772 A | 3/1942 | Heap ................................ 60/13 | | 3,899,880 A | 8/1975 | Rohs ........................... 60/39.61 |
| 2,280,375 A | 4/1942 | Chilton ............................ 308/6 | | 3,902,466 A | 9/1975 | Gulko ............................ 123/43 |
| 2,301,175 A | 11/1942 | Earnshaw et al. .............. 74/57 | | 3,902,468 A | 9/1975 | Turner ........................... 123/43 |
| 2,320,526 A | 6/1943 | Landis ........................... 123/58 | | 3,905,338 A | 9/1975 | Turner ........................... 123/43 |
| 2,326,912 A | 8/1943 | Allison .......................... 123/48 | | 3,913,534 A | 10/1975 | Bratten ..................... 123/8.49 |
| 2,337,543 A | 12/1943 | Christopher .................. 123/58 | | 3,923,018 A | 12/1975 | Markowitz .................... 123/43 |
| 2,353,313 A | 7/1944 | Lane .............................. 74/569 | | 3,929,107 A | 12/1975 | Renger .......................... 123/32 |
| 2,366,595 A | 1/1945 | Christopher .................. 123/51 | | 3,939,809 A | 2/1976 | Rohs ............................... 123/58 |
| 2,368,444 A | 1/1945 | Blanding | | 3,943,895 A | 3/1976 | Howell .......................... 123/58 |
| 2,369,002 A | 2/1945 | Allison | | 3,945,359 A | 3/1976 | Asaga ............................ 123/58 |
| 2,382,280 A | 8/1945 | Allison | | 3,968,776 A | 7/1976 | Rund .............................. 123/43 |
| 2,384,292 A | 9/1945 | Feroy | | 3,970,055 A | 7/1976 | Long .............................. 123/43 |

| | | | |
|---|---|---|---|
| 3,973,531 A | 8/1976 | Turner | 123/43 |
| 4,022,167 A | 5/1977 | Kristiansen | 123/43 |
| 4,022,168 A | 5/1977 | Sprague | 123/43 |
| 4,023,542 A | 5/1977 | Ango | 123/58 |
| 4,060,060 A | 11/1977 | Turner | 123/43 |
| 4,084,555 A | 4/1978 | Outlaw | 123/58 |
| 4,127,096 A | 11/1978 | Townsend | 123/41.56 |
| 4,129,101 A | 12/1978 | Townsend | 123/41.56 |
| 4,138,930 A | 2/1979 | Searle | 92/70 |
| 4,149,498 A | 4/1979 | Ferrell | 123/58 |
| 4,157,079 A | 6/1979 | Kristiansen | 123/43 |
| 4,172,552 A * | 10/1979 | Case et al. | 235/380 |
| 4,185,508 A | 1/1980 | Hardt | 74/53 |
| 4,195,600 A | 4/1980 | Shingai | 123/73 |
| 4,213,427 A | 7/1980 | Di Stefano | 123/43 |
| 4,219,001 A | 8/1980 | Kumagai et al. | 123/169 |
| 4,250,843 A | 2/1981 | Chang | 123/43 |
| RE30,565 E | 4/1981 | Kristiansen | |
| 4,287,858 A | 9/1981 | Anzalone | 123/43 |
| 4,358,671 A | 11/1982 | Case | |
| 4,363,294 A | 12/1982 | Searle | 123/43 |
| 4,366,784 A | 1/1983 | Paul | 123/45 |
| 4,418,656 A | 12/1983 | Stanton | 123/58 |
| 4,453,508 A | 6/1984 | Groeger | 123/193 |
| 4,492,188 A | 1/1985 | Palmer et al. | 123 |
| 4,502,427 A | 3/1985 | Brille | 123/90.41 |
| 4,510,894 A | 4/1985 | Williams | 123/48 |
| 4,520,765 A | 6/1985 | Gerace | 123/27 |
| 4,553,508 A | 11/1985 | Stinebaugh | 123/58 |
| 4,565,165 A | 1/1986 | Papanicolaou | 123/51 |
| 4,571,946 A | 2/1986 | Demopoulos | 60/618 |
| 4,592,309 A | 6/1986 | Williams | 123/39 |
| 4,610,223 A | 9/1986 | Karian | 123/58 |
| 4,632,081 A | 12/1986 | Giuliani et al. | 123/198 |
| 4,635,590 A | 1/1987 | Gerace | 123/27 |
| 4,648,358 A | 3/1987 | Sullivan et al. | 123/43 |
| 4,768,481 A | 9/1988 | Wood | 123/254 |
| 4,834,033 A | 5/1989 | Larsen | 123/58 |
| 4,867,107 A | 9/1989 | Sullivan et al. | 123/43 |
| 4,867,121 A | 9/1989 | Bivona et al. | 123/197 |
| 4,915,064 A | 4/1990 | Mannerstedt et al. | 123/58 |
| 4,960,082 A | 10/1990 | Sullivan et al. | 123/43 |
| 4,974,555 A | 12/1990 | Hoogenboom | 123/56 |
| 4,974,556 A | 12/1990 | Royse | 123/58 |
| 4,996,953 A | 3/1991 | Buck | 123/58 |
| 5,009,198 A | 4/1991 | Sullivan et al. | 123/43 |
| 5,014,653 A | 5/1991 | Sullivan et al. | 123/43 |
| 5,016,580 A | 5/1991 | Gassman | 123/58 |
| 5,023,782 A | 6/1991 | Lutz et al. | |
| 5,029,558 A | 7/1991 | Sullivan | 123/58 |
| 5,070,825 A | 12/1991 | Morgan | 123/43 |
| 5,083,532 A | 1/1992 | Wiesen | 123/58 |
| 5,103,778 A | 4/1992 | Usich, Jr. | 123/58 |
| 5,140,953 A | 8/1992 | Fogelberg | 123/58 |
| 5,159,902 A | 11/1992 | Grimm | 123/43 |
| 5,209,190 A | 5/1993 | Paul | 123/43 |
| 5,218,933 A | 6/1993 | Ehrlich | 123/56 |
| 5,228,415 A | 7/1993 | Williams | 123/51 |
| 5,322,042 A | 6/1994 | di Priolo et al. | 123/263 |
| 5,323,738 A | 6/1994 | Morse | 123/43 |
| 5,329,893 A | 7/1994 | Drangel et al. | 123/78 |
| 5,351,657 A | 10/1994 | Buck | 123/43 |
| 5,375,567 A | 12/1994 | Lowi, Jr. | 123/56.8 |
| 5,437,251 A | 8/1995 | Anglim et al. | 123/56.3 |
| 5,443,043 A | 8/1995 | Nilsson et al. | 123/48 |
| 5,452,691 A | 9/1995 | Nilsson et al. | 123/56.2 |
| 5,456,220 A | 10/1995 | Candler | 123/43 |
| 5,467,757 A | 11/1995 | Yanagihara et al. | 123/305 |
| 5,476,072 A | 12/1995 | Guy | 123/48 |
| 5,477,038 A | 12/1995 | Levine | 235/380 |
| 5,494,544 A | 2/1996 | Hill et al. | |
| 5,507,253 A | 4/1996 | Lowi, Jr. | 123/56.9 |
| 5,517,953 A | 5/1996 | Wiesen | 123/51 |
| 5,535,716 A | 7/1996 | Sato et al. | 123/279 |
| 5,551,383 A | 9/1996 | Novotny | 123/51 |
| 5,566,578 A | 10/1996 | Rose | 74/57 |
| 5,577,109 A | 11/1996 | Stimson et al. | |
| 5,627,909 A | 5/1997 | Blaylock et al. | |
| 5,636,561 A | 6/1997 | Pecorari | 91/499 |
| 5,647,308 A | 7/1997 | Biagini | 123/56.2 |
| 5,661,289 A | 8/1997 | Sasou et al. | |
| 5,704,332 A | 1/1998 | Motakef | 123/225 |
| 5,721,768 A | 2/1998 | Stimson et al. | |
| 5,743,220 A | 4/1998 | Guarner-lans | 123/56.9 |
| 5,749,337 A | 5/1998 | Palatov | 123/56.2 |
| 5,760,381 A | 6/1998 | Stich et al. | |
| 5,762,039 A | 6/1998 | Gonzalez | 123/197.3 |
| 5,765,512 A | 6/1998 | Fraser | 123/54.1 |
| 5,777,305 A | 7/1998 | Smith et al. | |
| 5,799,629 A | 9/1998 | Lowi, Jr. | 123/56.8 |
| 5,813,372 A | 9/1998 | Manthey | 123/43 |
| 5,832,880 A | 11/1998 | Dickey | 123/25 |
| 5,875,743 A | 3/1999 | Dickey | 123/25 |
| 5,890,462 A | 4/1999 | Bassett | 123/56.2 |
| 5,894,820 A | 4/1999 | Baeta | 123/56.1 |
| 5,898,158 A * | 4/1999 | Shimizu et al. | 235/383 |
| 5,904,044 A | 5/1999 | White | 60/443 |
| 5,950,580 A | 9/1999 | Birckbichler | 60/56.2 |
| 5,971,276 A | 10/1999 | Sano et al. | |
| 5,988,509 A | 11/1999 | Taskett | |
| 5,992,357 A | 11/1999 | Tasi | 123/56.2 |
| 6,003,480 A | 12/1999 | Quayle et al. | 123/56.1 |
| 6,003,763 A | 12/1999 | Gallagher et al. | |
| 6,089,195 A | 7/2000 | Lowi, Jr. | 123/53.6 |
| 6,092,512 A | 7/2000 | Ma | 123/568.15 |
| 6,106,020 A | 8/2000 | Leef et al. | |
| 6,134,309 A | 10/2000 | Carson | |
| 6,260,520 B1 | 7/2001 | VanReatherford | 123/48 |
| 6,270,012 B1 | 8/2001 | Dawson | |
| 6,386,457 B1 | 5/2002 | Sorie | |
| 6,588,658 B1 | 7/2003 | Blank | |
| 6,698,394 B2 | 3/2004 | Thomas | 123/241 |
| 2001/0001472 A1 | 5/2001 | Sano et al. | |
| 2001/0038033 A1 | 11/2001 | Habib | |
| 2002/0052852 A1 | 5/2002 | Bozeman | |
| 2002/0153414 A1 | 10/2002 | Stoutenburg et al. | |
| 2003/0028439 A1 | 2/2003 | Cox et al. | |
| 2003/0046249 A1 | 3/2003 | Wu | |
| 2003/0078883 A1 | 4/2003 | Stewart et al. | |
| 2003/0080185 A1 | 5/2003 | Werther | 235/380 |
| 2003/0018779 A1 | 10/2003 | Swift et al. | 705/40 |
| 2003/0183689 A1 | 10/2003 | Swift et al. | |
| 2003/0187790 A1 | 10/2003 | Swift et al. | |
| 2003/0197060 A1 | 10/2003 | Coyner | |
| 2003/0200179 A1 | 10/2003 | Kwan | |

OTHER PUBLICATIONS

PCT; International Preliminary Report on Patentability dated Sep. 13, 2006 in Application No. PCT/US2004/032189.

PCT; International Search Report and Written Opinion dated Aug. 10, 2006 in Application No. PCT/US2004/032189.

JP; Office Action dated Jun. 11, 2010 in Application No. 2006-535527.

JP; Office Action dated Feb. 12, 2010 in Application No. 2006-535527.

MX; Official Action dated May 2008 in Application No. PA/a/2006/004197.

US 6,019,073, 02/2000, Sanderson (withdrawn)

* cited by examiner

SYSTEMS, METHODS, AND DEVICES FOR SELLING TRANSACTION ACCOUNTS

CROSS-REFERENCE TO RELATED APPLICATIONS

This application claims priority to, and the benefit of, U.S. Provisional Application Ser. No. 60/511,495 entitled "SYSTEM, METHOD AND DEVICE FOR SELLING PREPAID CARDS USING MICR BACKBONE," filed Oct. 15, 2003, which is incorporated herein by reference.

FIELD OF INVENTION

The present invention generally relates to transaction accounts, and more particularly, to systems and methods for facilitating the distribution of transaction accounts.

BACKGROUND OF INVENTION

Consumers may use a transaction account, which may be associated with an account number, credit card, or gift card, as a form of payment or identification in various transactions. Transaction accounts are desirable for a number of reasons. For example, utilizing a transaction account associated with a pre-paid card may be a safe and convenient way to avoid carrying or handling cash and loose change. Also, it is often convenient to give pre-paid cards as gifts or to use pre-paid cards to pay for transactions while traveling.

Although an issuer of a transaction account may distribute the transaction device associated with the transaction account directly to consumers, it is also desirable for an issuer of a transaction account to distribute the card to consumers through a third-party distributor. For example, it may be desirable for an issuer to distribute an account, a credit card, and/or a pre-paid card through a bank. Furthermore, it is often convenient for consumers to purchase transaction cards while conducting other transactions with a third party, such as a bank. For example, an individual may wish to purchase a pre-paid card in conjunction with depositing a check at a bank.

Transaction accounts (with or without a physical card) currently available to consumers include, for example, telephone calling accounts, loyalty accounts, credit cards, and internet accounts. Furthermore, a variety of pre-paid cards associated with various types of accounts are currently sold to consumers. For example, the Travel Funds™ Card by American Express®, enables people to load money on a pre-paid card and then use it, worldwide, at any merchant that accepts American Express or at any of over half a million Automated Teller Machines ("ATMs") which accept American Express cards.

Unfortunately, the distribution of transaction accounts through distributors is somewhat hindered due to the difficulty and expense of establishing new systems of communication with the distributors. The new system may include an electronic communications system or a paper system for reporting back to the issuer regarding the distribution of the transaction account. Many potential distributors are reluctant to invest in new technology to distribute these products. Similarly, some distributors who might otherwise be inclined to distribute transaction accounts may be reluctant to adopt new systems if additional training is involved. As an example, banking institutions may be reluctant to expand into the selling of pre-paid cards, despite the fact that these institutions may already sell travelers checks, in an effort to avoid the cost of an entirely new communication system or new training associated with the additional product. Thus, it is desirable to develop new methods and systems for facilitating the distribution of transaction accounts that leverage the distributors' existing systems and procedures.

In this regard, the typical backbone for communication in the banking industry is the Magnetic Image Character Recognition ("MICR") line on the left-hand side on the bottom of checks. The digits in the MICR line indicate, for example, the bank's routing and transit number (so a spent check can be returned to the correct bank), the account number on which the check was drawn, and the check number and the dollar value (which is usually encoded after the check is spent). The banking industry has invested billions of dollars into using the MICR technology and is reluctant to make changes or introduce new technology and processes.

Rather than employ a separate process, the American Express Travelers Cheque business previously leveraged the MICR information and the underlying processes and technologies that are the foundation of check clearing for the entire banking system. A Travelers Cheque is legal tender that may not be associated with an account. Including MICR information on a Travelers Cheque facilitates the routing of the Travelers Cheque back to the issuer for payment when a customer spends the Travelers Cheque.

In addition, when Travelers Cheques are sold, a Purchase Agreement Form ("PAF") may be included in the envelope that contains the Cheque(s) being sold. This PAF also contains MICR information and the bank may use this form and/or the electronic information on the PAF to notify the issuer when a sale of a Travelers Cheque has occurred. As noted above, the MICR information on the Travelers Cheques and PAFs is the typical backbone for how issuers of Travelers Cheques communicate with all their bank sellers.

However, distributors of Travelers Cheques are not configured to distribute transaction accounts without establishing new communication networks. Thus, a need exists for a new distribution method that can take advantage of existing communication and processing systems to facilitate the distribution of transaction accounts.

SUMMARY OF INVENTION

Systems and methods are configured to facilitate the distribution of transaction accounts through distributors. In one exemplary embodiment of the present invention, a method is provided for facilitating the distribution of transaction accounts. The method includes the steps of: issuing a transaction account to a distributor and receiving information from the distributor via a MICR protocol, wherein the information reports the distribution of the transaction account. In various exemplary embodiments, the transaction account is a pre-paid card and the distributor is a seller of pre-paid cards. In other exemplary embodiments of the present invention, the method includes the steps of: issuing a transaction account to a distributor, receiving information from the distributor, and processing the information via a Travelers Cheque infrastructure, wherein the information reports the distribution of the transaction account.

In accordance with one aspect of the present invention, distribution of the transaction account may be facilitated by use of a sequential number. The sequential number may, for example, be a Travelers Cheque number. Furthermore, the sequential number may be displayed upon the card and/or a purchase agreement form as part of a MICR number. Thus, the system may be configured to be compatible with existing Travelers Cheque communication systems and processing systems already in place.

In yet another exemplary embodiment of the present invention, a financial transaction device includes a card that is associated with a first number that is configured to be communicated by distributor system 120 via a MICR protocol. The financial transaction device may also include a purchase agreement form that is also associated with the card and bears the first number in a manner that can be read by MICR technology. In various exemplary embodiments of the present invention, the serialized number is a Travelers Cheque number stored in a MICR format.

BRIEF DESCRIPTION OF DRAWINGS

A more complete understanding of the present invention may be derived by referring to the detailed description and claims when considered in connection with the Figures, wherein like reference numbers refer to similar elements throughout the Figures, and:

DETAILED DESCRIPTION

While the exemplary embodiments herein are described in sufficient detail to enable those skilled in the art to practice the invention, it should be understood that other embodiments may be realized and that logical and mechanical changes may be made without departing from the spirit and scope of the invention. Thus, the following detailed description is presented for purposes of illustration only and not of limitation.

In general, systems, methods, and devices are configured to facilitate the distribution of a transaction account through a distributor. The distribution of a transaction account may be facilitated by, for example, using pre-existing banking communication protocols for communication between the issuer and distributor of the transaction account. As used herein, a "communication protocol" or similar phrases may include rules governing syntax, semantics, and synchronization of communication and/or one or more of message formats, a description of message formats, rules for exchanging messages, signaling, authentication, error detection, and correction capabilities. Distribution of transaction accounts may also be facilitated by using pre existing Travelers Cheque and/or transaction account infrastructure(s) to process information communicated from the distributor and/or to provide services related to the transaction account.

Figure 1:
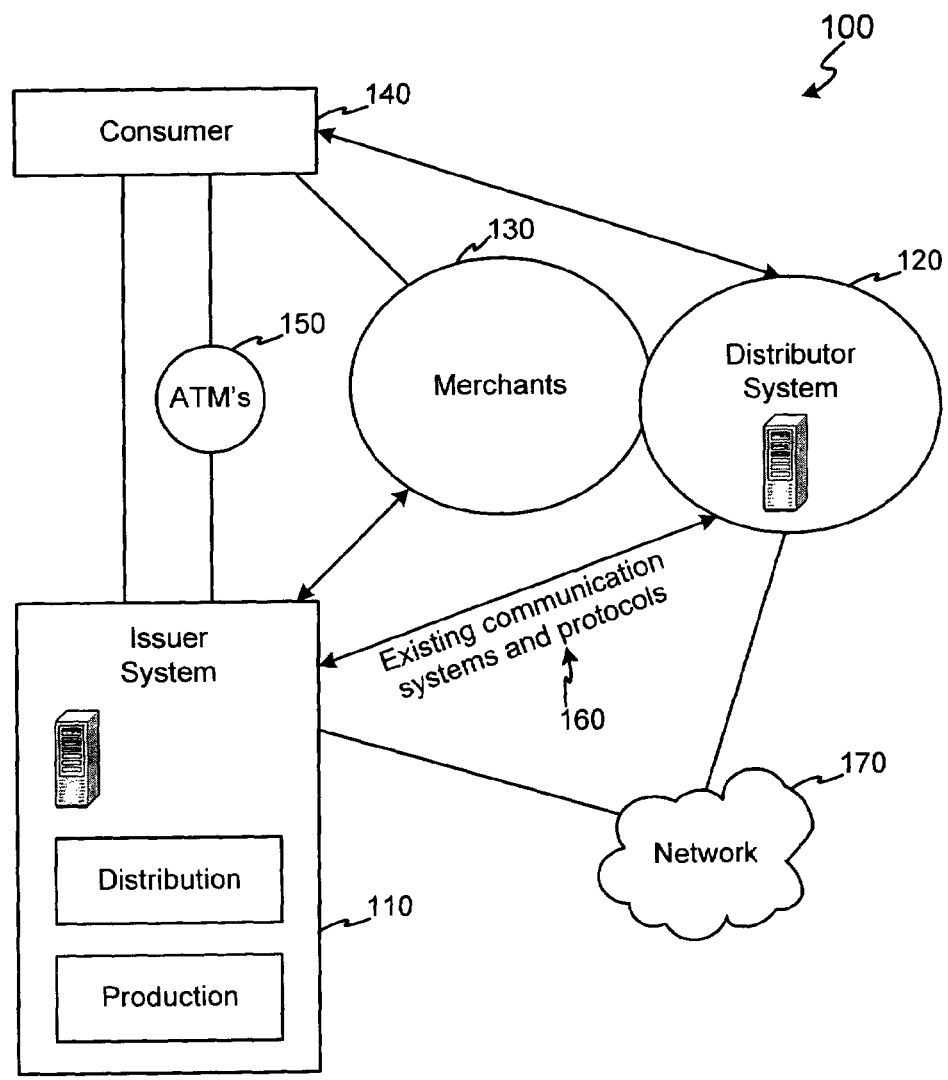
FIG. 1 illustrates a block diagram overview of an exemplary transaction account distribution system.

With respect to a general exemplary system configuration and with reference to FIG. 1, a transaction account distribution system 100 comprises an issuer system 110 and a distributor system 120. Issuer system 110 is any person, entity, software and/or hardware configured to issue a transaction account to distributor system 120. Distributor system 120 is any person, entity, software and/or hardware configured to distribute the transaction account to a consumer 140 that may use the transaction account with merchants 130, automated teller machines ("ATMs") 150, and/or the like. Issuer system 110 may be configured to communicate with distributor system 120, merchant system 130, ATMs 150, and/or consumers 140. In these examples, communications may take place in various manners, for example, via a network 170, or via other modes of communication.

The systems and/or components of the systems discussed herein may also include one or more host servers or other computing systems including a processor configured to process digital data, a memory coupled to the processor for storing digital data, an input digitizer coupled to the processor for inputting digital data, an application program stored in the memory and accessible by the processor for directing processing of digital data by the processor, a display coupled to the processor and memory for displaying information derived from digital data processed by the processor and a plurality of databases, the databases including distribution data, customer data, merchant data, financial institution data and/or like data that could be used in association with the present invention. As those skilled in the art may appreciate, a computer may also include an operating system (e.g., Windows NT, 95/98/2000, Linux, Solaris, etc.) as well as various conventional support software and drivers typically associated with computers.

In one exemplary embodiment of the present invention, distributor system 120 is a bank configured to sell a pre-paid card to consumer 140 via an in-person transaction. Consumer 140 may then use the pre-paid card at merchants 130, ATMs 150 and/or the like. In this example, transaction account distribution system 100 may facilitate the sale of the pre-paid card by using existing communication systems 160 between bank 120 and pre-paid card issuer system 110. For example, the pre-paid card may be physically associated with a MICR line that can be optically scanned by bank 120 to facilitate communication of information related to the sale of the pre-paid card. As used herein, a MICR line may include any indicia that may provide information including, for example, numbers, letters, bar codes, symbols, electronic (e.g., radio frequency) or optical signals, and/or the like. Furthermore, as used herein, MICR protocol refers to the MICR protocol which is used by the banking and financial services industries in the United States and/or worldwide. Issuer system 110 may also be configured to use a Travelers Cheque infrastructure to receive information received from bank 120 and to use a Travelers Cheque and/or transaction account infrastructure to process the information and/or to provide other services related to the pre-paid card.

Although described as a bank in the example above, in general, distributor system 120 may be any software, hardware, financial institution, travel agency, merchant, an internet based distributor system, or other entity that is configured to distribute a transaction account. In accordance with various aspects of the present invention, distributor system 120 may have been previously configured to interact with issuer system 110 for a purpose other than the distribution of a transaction account. For example, distributor system 120 may be configured to sell Travelers Cheques and to communicate (directly or indirectly) with the issuer of the Travelers Cheques. In this example, distributor system 120 may be a bank, travel agency or other entity that is configured to sell Travelers Cheques and is configured with suitable communications systems.

In accordance with one aspect of the present invention, distributor system 120 may be any system configured to communicate via an existing banking protocol that may be used for purposes other than the distribution of transaction accounts. In accordance with another aspect, distributor system 120 may be any system configured to communicate with an issuer that uses a Travelers Cheque infrastructure to facilitate distribution of transaction accounts.

As used herein, a transaction account may include any transaction device associated with a transaction account. A transaction account may comprise both physical and non-physical embodiments. For example, a transaction account may be distributed in a non-physical embodiment such as an account number, frequent flyer account, telephone calling account, and/or the like. Furthermore, a physical embodiment of a transaction account may be distributed as a credit card, debit card, loyalty card, pre-paid card, diner's card, phone card, and/or the like.

Furthermore, transaction accounts may be associated with various applications that allow the customers to participate in various programs, such as, for example, loyalty programs. A loyalty program may include one or more loyalty accounts. Exemplary loyalty programs include frequent flyer miles, on-line points earned from viewing or purchasing products at websites on-line, and programs associated with diner's cards, credit cards, debit cards, hotel cards, and/or the like. Generally, the user is both the owner of the transaction account and the participant in the loyalty program; however, this association is not necessary. For example, a participant in a loyalty program may gift loyalty points to a user who pays for a purchase with his own transaction account, but uses the gifted loyalty points instead of paying the monetary value.

For more information on loyalty systems, transaction systems, and electronic commerce systems, see, for example, U.S. patent application Ser. No.: U.S. Utility patent application Ser. No. 10/304,251, filed on Nov. 26, 2002 by inventors Antonucci et al. and entitled "System and Method for Transfer of Loyalty Points"; U.S. Continuation-In-Part patent application Ser. No. 10/378,456, filed on Mar. 3, 2003 by inventors Antonucci et al. and entitled "System and Method for the Real-Time Transfer of Loyalty Points Between Accounts"; U.S. patent application Ser. No. 09/836,213, filed on Apr. 17, 2001 by inventors Voltmer, et al. and entitled "System And Method For Networked Loyalty Program"; U.S. Continuation-In-Part patent application Ser. No. 10/027,984, filed on Dec. 20, 2001 by inventors Ariff, et al. and entitled "System And Method For Networked Loyalty Program"; U.S. Continuation-In-Part patent application Ser. No. 10/010,947, filed on Nov. 6, 2001 by inventors Haines, et al. and entitled "System And Method For Networked Loyalty Program"; U.S. Continuation-In-Part patent application Ser. No. 10/084,744, filed on Feb. 26, 2002 by inventors Bishop, et al. and entitled "System And Method For Securing Data Through A PDA Portal"; the "Shop AMEX™ system" as disclosed in Ser. No. 60/230,190, filed Sep. 5, 2000; the "Loyalty As Currency™ and Loyalty Rewards Systems" disclosed in Ser. No. 60/197,296 filed on Apr. 14, 2000, Ser. No. 60/200,492 filed Apr. 28, 2000, Ser. No. 60/201,114 filed May 2, 2000; "a digital wallet system" disclosed in U.S. Ser. No. 09/652,899 filed Aug. 31, 2000; "a stored value card" as disclosed in Ser. No. 09/241,188 filed on Feb. 1, 1999; "a system for facilitating transactions using secondary transaction numbers" disclosed in Ser. No. 09/800,461 filed on Mar. 7, 2001, and also in related provisional applications Ser. No. 60/187,620 filed Mar. 7, 2000, Ser. No. 60/200,625 filed Apr. 28, 2000 and Ser. No. 60/213,323 filed May 22, 2000, all of which are herein incorporated by reference. Other examples of an online loyalty systems are disclosed in Netcentives U.S. Pat. No. 5,774,870, issued on Jun. 30, 1998, and U.S. Pat. No. 6,009,412, issued on Dec. 29, 1999, both of which are hereby incorporated by reference.

In accordance with another aspect of the present invention, the transaction account may be distributed via any suitable distribution technique. For example, the transaction account may be sold to a consumer. In this example, the transaction account may be purchased by the distributor and resold to a consumer. In another exemplary embodiment, however, the transaction account may be consigned to the distributor who, upon sale to a consumer, pays the issuer. Other distribution techniques may also be employed.

Regardless of the distribution technique used or the type of transaction account distributed, in general, distributor system 120 is configured to communicate with issuer system 110. The information communicated may vary depending on the distribution technique used, the type of transaction account, the security systems in place, and/or the like. In one exemplary embodiment, the information communicated includes the consumer name, an account number, a sequential number, the date of distribution of the transaction account, the time of distribution, the place of distribution (if applicable), the type of transaction account distributed, and/or the like. The communicated information may be useful for the issuer and distributor to reconcile amounts owed between themselves, to track inventory, to limit fraud, to activate the transaction account, and/or to provide additional services.

Typically, distributors are reluctant to begin distributing a different product if doing so would involve the time and expense of establishing a system for communicating with the issuer of the product. Furthermore, distributors may be reluctant to add new products to the extent that distribution of a new product involves additional training. Thus, in accordance with one exemplary embodiment of the present invention, distributor system 120 is configured to leverage communication systems and/or protocols 160 which may already be fully or partially established and fully or partially used by distributor system 120. For example, communications systems and/or protocols 160 may comprise the MICR banking communication systems and protocols. Many distributors, such as banks, are already configured to optically scan or otherwise enter the MICR number of a check into a MICR communications system. Although MICR protocols are used for reporting checking information to an ACH system, they are also used to report information, regarding the sale of Travelers Cheques, to the issuer of the Travelers Cheque. Thus, in one exemplary embodiment, distributor system 120 is configured to use a MICR system and/or protocol to communicate, to issuer system 110, information associated with the distribution of a transaction account. In this manner, a distributor may leverage an existing system for reporting the distribution of a new product namely a transaction account. Moreover, distributor systems 120 that are not initially configured to have a MICR system may find it efficient to purchase a complete or any portion of an established and developed MICR system that is capable of handling multiple tasks, one of which may now include the distribution of transaction accounts.

Distributor system 120 may have a computing center such as a mainframe computer. However, the computing center of distributor system 120 may be implemented in other forms, such as a personal computer, a mini-computer, a PC server, a network set of computers, or the like. In accordance with yet another exemplary embodiment of the present invention, distributor system 120 is configured to communicate information to issuer system 110 in a format suitable for the issuer of the transaction account to process the information using a Travelers Cheque infrastructure. The distribution information may, for example, be communicated via batch processing that is performed on a daily basis, in real time, and/or at some other appropriate interval. The distribution information may be communicated to issuer 110 directly in electronic format or indirectly in a verbal, or printed format that later is entered in electronic format into issuer system 110.

Issuer system 110 may include any software, hardware, financial institution, credit card company, bank, business, and/or the like that is configured to issue a transaction account. The distribution information may be received via a MICR protocol and/or the distribution information may be processed using a Travelers Cheque infrastructure. Thus, regardless of the method used by distribution system 120 to communicate the distribution information to issuer system 110, in accordance with an exemplary embodiment of the present invention, the Travelers Cheque system of issuer system 110 may be leveraged to process distribution information and offer services. In various exemplary embodiments of the present invention, transaction account distributor system 100 is configured to leverage both the MICR communication protocol and/or the Travelers Cheque infrastructure.

Issuer system 110 may include, for example, an established system for delivering Travelers Cheques to distributors, tracking inventory, preventing fraud, replacing lost Travelers Cheques, sending commission payments, receiving amounts owed, performing accounting, and/or the like. These established Travelers Cheque infrastructures may, in accordance with one aspect of the present invention, be leveraged to perform similar functions for the distribution of transaction accounts.

Thus, issuer system 110 may include a production system for producing physical embodiments of transaction accounts and/or for creating the accounts. Issuer system may also include an issuer distribution system for delivering physical embodiments of transaction accounts to distributor system 120. In addition, issuer system 110 may be configured to track inventory, receive information from distributor system 120, identify fraud, replace lost Travelers Cheques, send commission payments, receive amounts owed, perform accounting, and/or the like for transaction accounts by using a Travelers Cheque infrastructure. Furthermore, issuer systems 110 that are not initially configured to utilize a Travelers Cheque infrastructure may find it efficient to purchase a complete or any portion of an established and developed Travelers Cheque infrastructure capable of handling processing of Travelers Cheques and, in accordance with one aspect of the present invention, transaction accounts.

By way of example, issuer system 110 may be a financial institution that is configured to issue a pre-paid card to distributor system 120, e.g., a bank. In one exemplary embodiment, issuer system is configured to consign the transaction account to the bank. Issuer system 110 may be further configured to pay a commission to the distributor and/or receive payment from the distributor.

As used herein, the terms "user", "end user", "consumer", "customer" or "participant" may be used interchangeably with each other, and each shall mean any person, entity, machine, hardware, software, business, issuer system, and/or distributor system. Each user may be equipped with a computing system to facilitate online commerce transactions. For example, the user may have a computing unit in the form of a personal computer, although other types of computing units may be used including laptops, notebooks, hand held computers, set-top boxes, and/or the like. The user computer can be in a home or business environment with access to a network. In an exemplary embodiment, access may be through the Internet through a commercially available web-browser software package.

Furthermore, the terms "business" or "merchant" may be used interchangeably with each other and shall mean any person, entity, distributor system, software and/or hardware that is a provider, broker and/or any other entity in the distribution chain of goods or services. For example, the merchant may be a ticket/event agency (e.g., Ticket-master, Telecharge, Clear Channel, brokers, agents), a grocery store, an on-line merchant, and/or the like. The user may communicate with the merchant in person (e.g., at the box office), telephonically, or electronically (e.g., from a user computer via an internet). During the interaction, the merchant may offer goods and/or services to the user. The merchant may also offer the user the option of paying for the acquisition using a transaction account. Furthermore, the transaction account may be used by the merchant as a form of identification of the user. The merchant may have a computing unit implemented in the form of a computer-server, although other implementations are possible.

Communication between the user and/or merchant and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art may also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The merchant system may include a computer that may be configured to provide a suitable website or other Internet-based graphical user interface that is accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Intervase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and/or the like.

It may be appreciated that many applications of the present invention could be formulated. One skilled in the art may appreciate that a network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention is frequently described herein as being implemented with TCP/IP communications protocols, it may be readily understood that the invention could also be implemented using IPX, Appletalk, IP-6, NetBIOS, OSI or any number of existing or future protocols. Moreover, the system may contemplate the use, sale or distribution of any goods, services or information over any network having similar functionality described herein.

The computing units may be connected with each other via a data communication network. The network may be a public network and assumed to be insecure and open to eavesdroppers. In the illustrated implementation, the network may be embodied as the internet. In this context, the computers may or may not be connected to the internet at all times. For instance, the customer computer may employ a modem to occasionally connect to the internet, whereas the bank computing center might maintain a permanent connection to the internet. Specific information related to the protocols, standards, and application software utilized in connection with the Internet may not be discussed herein. For further information regarding such details, see, for example, DILIP NAIK, "INTERNET STANDARDS AND PROTOCOLS" (1998); "JAVA 2 COMPLETE", various authors, (Sybex 1999); DEBORAH RAY AND ERIC RAY, "MASTERING HTML 4.0" (1997). LOSHIN, "TCP/IP CLEARLY EXPLAINED" (1997). All of these texts are hereby incorporated by reference.

The systems may be suitably coupled to the network via data links. A variety of conventional communications media and protocols may be used for data links. For example, a connection to an Internet Service Provider (ISP) over the local loop as is typically used in connection with standard modem communication, cable modem, Dish networks, ISDN, Digital Subscriber Line (DSL), or various wireless communication methods. The merchant system might also reside within a local area network (LAN) that interfaces to the network via a leased line (T1, D3, etc.). Such communication methods are well known in the art and are covered in a variety of standard texts. See, e.g., GILBERT HELD, "UNDERSTANDING DATA COMMUNICATIONS" (1996), hereby incorporated by reference.

The distributor and the issuer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Examplary transaction networks may include the American Express®, VisaNet® and the Veriphone® networks.

Any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. In this regard, the data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first issuer, a second data set which may be stored may be provided by an unrelated second issuer, and yet a third data set which may be stored, may be provided by an third issuer unrelated to the first and second issuer. Each of these three exemplary data sets may contain different information that is stored using different data storage formats and/or techniques. Further, each data set may contain subsets of data which also may be distinct from other subsets.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified merchants are permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one preferred embodiment, the header or trailer is not stored on the transaction device along with the associated issuer-owned data but instead the appropriate action may be taken by providing to the transaction instrument user at the stand alone device, the appropriate option for the action to be taken. However, the present invention contemplates a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the present invention may consist of any combination thereof at a single location or at multiple locations, wherein each database or system includes any of various suitable security features, such as firewalls, access codes, encryption, decryption, compression, decompression, and/or the like.

Figure 2:
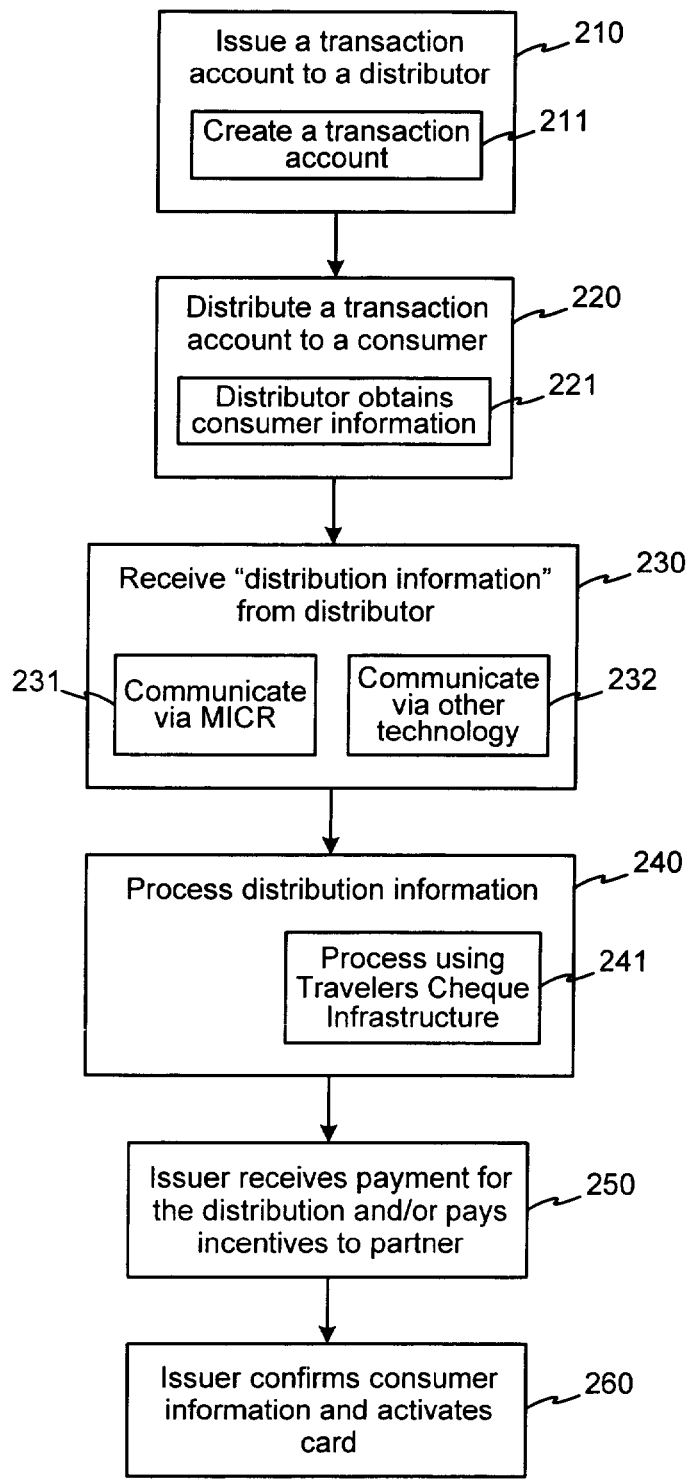
FIG. 2 illustrates a flow diagram showing an exemplary transaction account distribution method.

The foregoing system components may be configured for performing the following method which includes facilitating the distribution of a transaction account. In general, distribution of transaction accounts may include such steps as: issuing a transaction account to a distributor and receiving distribution information from the distributor via a MICR protocol and/or processing distribution information via a Travelers Cheque infrastructure. With reference to FIG. 2, an exemplary method 200 includes issuing a transaction account to a distributor (step 210), distributing the transaction account to customers (step 220), receiving distribution information from the distributor in a MICR protocol (step 230), and/or processing the distribution information via a Travelers Cheque infrastructure (step 240).

In accordance with various exemplary embodiments of the present invention, issuing the transaction account to a distributor (step 210) may include the step of creating the transaction account (step 211). Creation of the transaction account may include both electronic and physical activities. For example, the card may be created physically and the account created electronically. The transaction account may be created electronically by, for example, creating an account number that is associated with the transaction account. The account number may be, for example, a credit card number or other number as described herein. For security reasons, account numbers are often random numbers. The account number may be associated with other account specific information in a database, look up table and/or the like. For example, the account may be configured to be worth a particular number of minutes, a pre-determined value, a specific reward, and/or the like.

In addition to the account number, a sequential number may be created. In accordance with various exemplary embodiments of the present invention, the serial number is a sequential number. The serial number, in various exemplary embodiments comprises a portion of the MICR line number similar to the method of integrating Travelers Cheques serial numbers into the MICR number. The sequential number may facilitate the tracking of inventory.

Physically, a financial transaction device may comprise a magnetic stripe card, payfob transponder, or the like. Additional exemplary physical embodiments are described elsewhere herein. In accordance with additional exemplary embodiments of the present invention, the financial transaction device may also comprise a purchase agreement form that is configured for issuance in conjunction with the transaction account as described below. Issuer system 110 may provide a card account number and a serial number to a manufacturer that produces the physical transaction device. The manufacturer may additionally print the purchase agreement form and package the card and the purchase agreement form in an envelope. One or more of the card, purchase agreement form and the envelope may be marked with the sequential number to facilitate inventory tracking.

The envelopes may be shipped to distribution centers for later issuance to distributor systems 120. Issuing the transaction account (step 210), in one exemplary embodiment, includes consigning the transaction account to the distributor. For example, upon delivery, a distributor may sign a receipt acknowledging responsibility for the delivered set of pre-paid cards which may be individually identified on the receipt. This receipt may be mailed, faxed, or electronically transmitted to the issuer to confirm receipt of the pre-paid cards. In other exemplary embodiments, issuing the transaction account includes selling the transaction account (or the right to distribute the same) to the distributor.

The distributor may distribute the transaction account (step 220) using various techniques. For example, the distributor may sell the transaction account to customer 140. However, the distributor may give the transaction account to a customer for free or even entice a customer to obtain the transaction account in exchange for value. For example, a bank might offer incentives, such as T-shirts, low interest rates, or other rewards with each credit card that is distributed to customer 140. Other techniques for distributing the transaction account may also be used.

When the transaction account is distributed, often the distributor collects information from the customer (step 221). The customer information may include, for example, the customer name, password, social security number, birth date and other personal identification information, and/or the like. Such information may be combined with other information related to the distribution of the transaction account such as, for example, the place and date of sale of the transaction account, the 'value' associated with a pre-paid card, and/or the like. All or any portion of this combined information ("distribution information") may be communicated to the issuer system (step 230).

In various exemplary embodiments of the present invention, the distribution information is transmitted to the issuer system via a MICR backbone. To gather the information for transmission, the distributor may, for example, scan a MICR line serial number located on the physical transaction account (e.g., on a pre-paid card) and/or scan a MICR line serial number located on the purchase agreement form accompanying the transaction account (step 231). In one exemplary embodiment, this MICR line may be identical in format to the MICR line of a typical Travelers Cheque. Distributor system 120 may be configured to recognize codes within the MICR line and, based on the codes, to determine the amount that the distributor owes to the issuer. In other exemplary embodiments, the MICR serial number may be entered into an electronic system manually or by other means (bar code, machine readable code, etc.)(step 232). For example, an internet webpage based system may be configured with fields for manual or automatic entry of a MICR format serial number as well as other information comprising the distribution information. The fields may, for example, be similar to fields used in connection with distributing Travelers Cheques; however, other formats may also be used. The American Express "Express Check" software is one example of such a system. Moreover, the internet webpage may be configured to transmit/communicate distribution information to an issuer in formats other than a MICR format. In yet another exemplary embodiment, the purchase agreement form may be faxed, mailed, or the like, to issuer system 110.

The distribution information may be stored and transmitted in batches, or transmitted in substantially real time. A batch transmission of distribution information may, for example, include several transactions including various products, individual transaction information, and/or summary information. For example, a single batch transmission may comprise the transmission of a file containing a summary of amounts the distributor owes to the issuer, the total number of Travelers Cheques sold, the total number of pre-paid cards sold, and distribution information specifying the serial number of the sold pre-paid cards. The distribution information may be communicated to the issuer via systems currently used in distributor systems 120. For example, the distribution information may be transmitted via the MICR backbone system to issuer system 110. In another exemplary embodiment, the distribution information is communicated to issuer system 110 via the internet or other suitable communication systems. Therefore, in various exemplary embodiments, distribution information is communicated to issuer system 110 via the same systems used for Travelers Cheques. The issuer receives the distribution information and may process the information (step 240).

Processing of the distribution information may take place through a combination of systems that may already be established at issuer system 110. For example, issuer system 110 may comprise both a Travelers Cheque infrastructure and a transaction account infrastructure (e.g., a pre-paid card infrastructure). The Travelers Cheque infrastructure may be configured to receive and process the distribution information and to transmit data to the transaction account infrastructure. For example, a Travelers Cheque infrastructure may share inventory management and seller data with a pre-paid card infrastructure. Thus, financial transaction account distribution system 100 may be configured to leverage the functions and services of pre-existing Travelers Cheque and transaction account infrastructures by receiving communications through a Travelers Cheque communication system and sharing information between the two infrastructures.

In accordance with one exemplary embodiment of the present invention, issuer system 110 may be configured to leverage a Travelers Cheque infrastructure to process the distribution information and/or to provide services related to the transaction account. For example, through the Travelers Cheque infrastructure, issuer system 110 may be configured to pay the distributor a commission for the distribution of the transaction account (step 250). In accordance with one exemplary embodiment of the present invention, the commission payment system may be similar to that used in paying commissions for sales of Travelers Cheques, although other systems may also be used.

In accordance with yet another exemplary embodiment of the present invention, issuer system 110 may be configured to leverage a transaction account infrastructure to process the distribution information and/or to provide services related to the transaction account. For example, through a transaction account infrastructure, issuer system 110 may also be configured to activate the transaction account (step 260). The purchaser of a pre-paid card, for example, may call an interactive voice response system associated with a pre-paid card infrastructure to activate the pre-paid card. In accordance with one exemplary embodiment of the present invention, the account activation system itself may be similar to prior art transaction account activation systems.

The Travelers Cheque/transaction account infrastructure(s) may be configured to verify that activation is appropriate. For example, the infrastructure may be configured to verify that this particular card has been sold. Furthermore, the purchaser may be asked to provide the card number, their date of birth, the last four digits of their social security number, and/or the like for the purposes of confirming that activation is appropriate. The infrastructure may further be configured to detect fraud (e.g., detect an attempt to use a card that has not yet been sold), to refund or replace a lost transaction account, to track product inventory, to know when and how much to pay sellers as a commission, and to collect from sellers for the consignment sale. For example, if customer 140 reports a transaction account as lost or stolen, through the MICR information on the PAF, the issuer can determine if that transaction account was sold, where it was sold, etc. and thereby ask the customers questions to determine if the customer is entitled to a refund.

Figure 4:
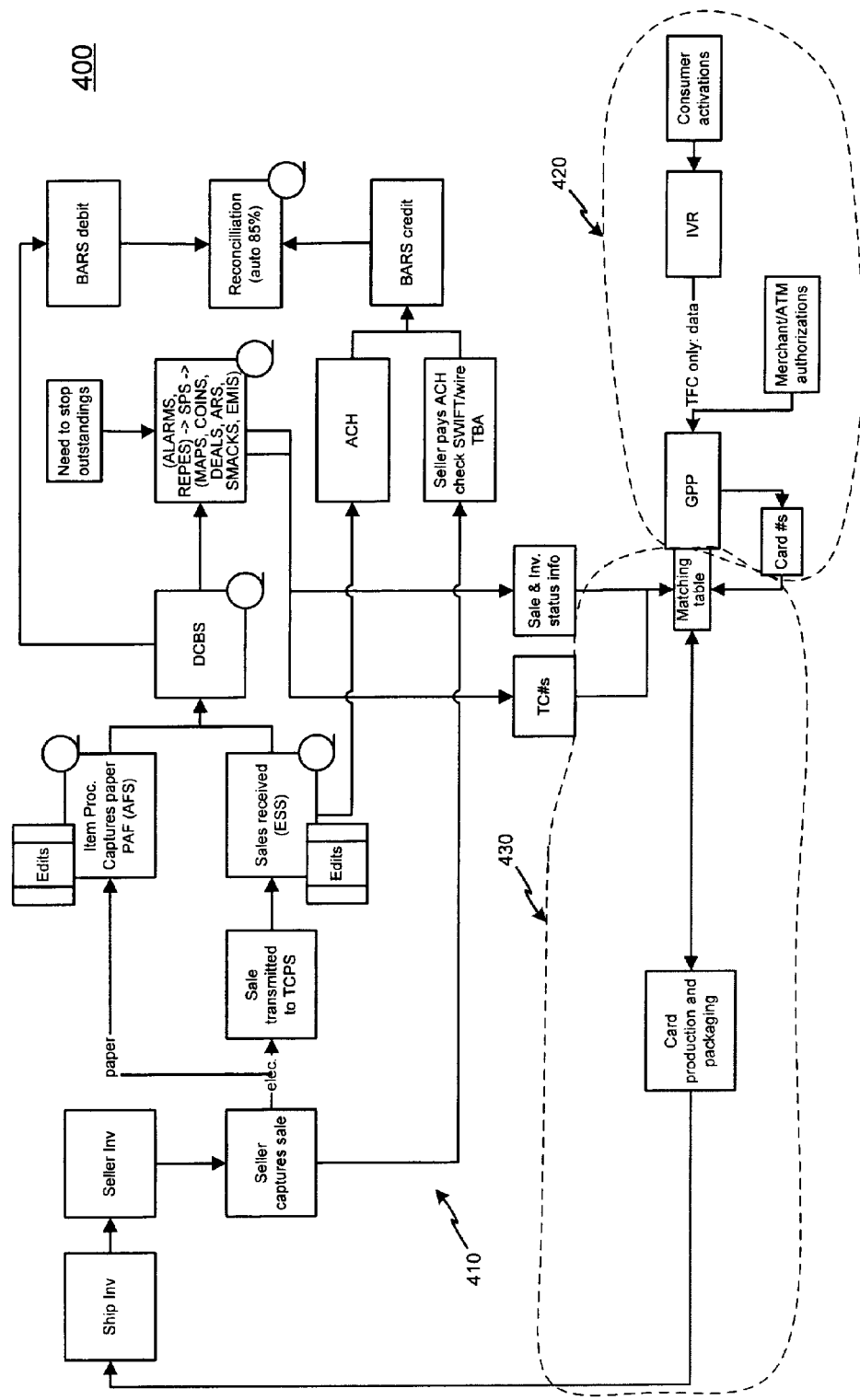
FIG. 4 illustrates another block diagram overview of an exemplary Travelers Cheque infrastructure and an exemplary transaction card infrastructure.

FIG. 4 illustrates an exemplary system 400 that is configured to facilitate the distribution of a transaction account. System 400 combines an exemplary Travelers Cheque infrastructure 410 and an exemplary transaction account infrastructure 420. Various Travelers Cheque infrastructures and transaction card infrastructures may be used in system 400, and therefore the details of infrastructures 410 and 420 are not explained in detail. In one exemplary embodiment, transaction account infrastructure 420 may be a pre-paid card infrastructure configured with an interactive voice response system facilitating consumer activation. Transaction account system 420 may be configured to provide card numbers to a matching table and to communicate with the matching table, providing new functionality 430. Travelers Cheque infrastructure 410 may be configured to provide Travelers Cheque numbers and/or sales and inventory status information to a matching table. Thus, the matching table may facilitate card production and packaging. The newly produced inventory may then be passed to an inventory shipping process within Travelers Cheque infrastructure 410 and infrastructure 410 may, for example, facilitate the distribution of the pre-paid cards. Various other links and communication of information between infrastructures 410 and 420 may also be used to facilitate distribution of transaction accounts.

From the issuer's perspective, in accordance with various aspects of the present invention, an issuer is able to facilitate the distribution of transaction accounts. The issuer creates the transaction accounts, issues the transaction accounts to a distributor, receives information back from the distributor upon distribution of the transaction account, and processes the information received. The information is received, in one exemplary embodiment via the MICR protocol. In yet another exemplary embodiment, the information is received by the issuer's Travelers Cheque infrastructure and processed by the issuer's Travelers Cheque and/or transaction account infrastructure(s). Thus, the issuer leverages one or more existing systems to distribute transaction accounts.

From the distributor's perspective, in accordance with another aspect of the present invention, a distributor may distribute a transaction account using existing systems and sales techniques that are typically used to distribute Travelers Cheques. For example, the distributor may receive a shipment of a box of credit cards, each in an envelope that may be similar to those used to contain Travelers Cheques. The envelopes may each contain, for example, a credit card, and each envelope may bear identifying indicia, such as a MICR number or portion thereof. The MICR number may comprise, at least in part, a sequential serial number that may facilitate, for example, tracking of inventory.

The distributor may ask its customers if they would like to open a credit card account. If the customer's answer is in the affirmative, the distributor may obtain customer information and may scan the purchase agreement form using the same MICR scanner that is typically used for Travelers Cheque sales. In various exemplary embodiments of the present invention the distributor receives payment for the transaction. In this example, the credit card is given to customer 140 in connection with the transaction. Distribution information may be batch transmitted, for example, at the end of the day. Thus, with minimal or no additional processes or investment in technology, the distributor may earn commissions or realize other incentives for distribution of additional product, e.g., a credit card.

From the customer's perspective, in accordance with yet another aspect of the present invention, a customer obtains the benefit and convenience of obtaining a pre-paid card through, for example, a bank. The customer could, however, obtain the pre-paid card in-person, over the telephone, on line, and/or the like. For example, a customer may enter a bank and perform a banking transaction. The clerk may ask if the customer would like to purchase a pre-paid card. The customer may answer in the affirmative and request a pre-paid card of a specific denomination, provide personal information on a purchase agreement form, and pay for the pre-paid card. The customer may later activate the card by calling a number on the card and providing the purchase location or other identifying information.

An exemplary pre-paid card is the Gift Card by American Express. This product allows someone to load, for example, $25, $50, $100, or $500 onto a card and then give it to the gift recipient. The gift recipient may then buy merchandise on the card at any retailer or restaurant that accepts American Express. This exemplary Gift Card facilitates giving a gift that can be used at millions of merchants in contrast to a single store gift certificate/card, which has limited use. This system could be also be used with providers other than American Express and on various financial instruments.

Figure 3:
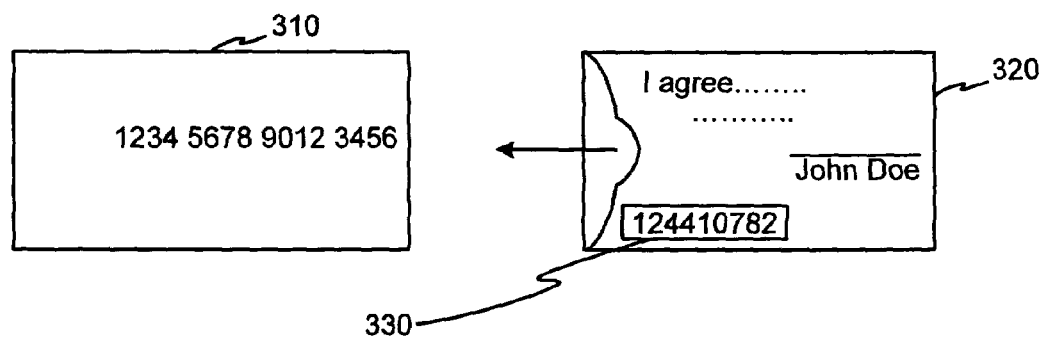
FIG. 3 illustrates an exemplary financial transaction device.

With reference now to FIG. 3, an exemplary transaction account distribution device 300 is configured to facilitate distribution of a card by a distributor. Transaction account distribution device 300 may include a card 310 and a purchase agreement form 320. Purchase agreement form 320, in accordance with exemplary embodiments of the present invention, may accompany card 310 when issued to the distributor. Furthermore, one or both of the pre-paid card and purchase agreement form may include a serialized number.

Card 310 may include one or more physical devices used in carrying out various financial transactions. For example, card 310 may comprise a pre-paid card, rewards card, telephone card, smart card, magnetic stripe card, radio frequency card and/or the like. In yet another exemplary embodiment of the present invention, card 310 may be an electronic coupon, voucher, speed pass, and/or other such instrument. Card 310 may be used to pay for acquisitions, obtain access, provide identification, pay an amount, receive payment, redeem reward points and/or the like.

Card 310 may be associated with an account number/card number. Furthermore, an "account number", "card number", "code", "identifier" or "loyalty number", as used herein, includes any device, code, or other identifier/indicia suitably configured to allow the consumer to interact or communicate with the system, such as, for example, authorization/access code, personal identification number (PIN), Internet code, other identification code, and/or the like that is optionally located on a rewards card, pre-paid card, telephone card, smart card, magnetic stripe card, bar code card, radio frequency card and/or the like. The account number may be distributed and stored in any form of plastic, electronic, magnetic, radio frequency, audio and/or optical device capable of transmitting or downloading data from itself to a second device.

An account number may be, for example, a sixteen-digit card number, although each card provider has its own numbering system, such as the fifteen-digit numbering system used by an exemplary loyalty system. Each company's card numbers comply with that company's standardized format such that the company using a sixteen-digit format may generally use four spaced sets of numbers, as represented by the number "0000 0000 0000 0000". The first five to seven digits are reserved for processing purposes and identify the issuing bank, card type and etc. In this example, the sixteenth digit is used as a sum check for the sixteen-digit number. The intermediary eight-to-ten digits are used to uniquely identify the customer. In addition, loyalty account numbers of various types may be used.

In accordance with one exemplary embodiment of the present invention, card 310 may be associated with a purchase agreement form 320. Purchase agreement form 320 may, for example, include contractual terms, such as terms and conditions for use of card 310. By way of example, PAF 320 may be similar to the envelope and/or paper material accompanying the sale of Travelers Cheques. In accordance with an exemplary embodiment, purchase agreement form 320 is configured to be packaged with one or more cards 310 and further serves to identify the card 310.

In this regard, card 310 may be associated with a serialized number 330. Serialized number 330 may, for example, be printed on purchase agreement form 320, on card 310, or both. Purchase agreement form 320 may further be configured to be wholly or partially separated from pre-paid card 310. Thus, all or a portion of purchase agreement form 320 may be retained by the distributor after the sale of the pre-paid card.

In accordance with various exemplary embodiments of the present invention, serial number 330 is configured to be a Travelers Cheque number or a portion thereof. Thus, the serial number may be used in a system that otherwise is configured for the sale of Travelers Cheques. Moreover, in other exemplary embodiments, the serial number may be configured as part of a MICR number. For example, the serial number may be inserted at the end of the MICR number, within the MICR number and/or converted to another number. Thus, the serialized number may be machine read from the surface of, for example a purchase agreement form, and distribution information may be conveyed to issuing system 110 via MICR systems and protocols.

In one embodiment, the various processes may include a user facilitating the input of information into a computer system. The information may be inputted via keypad, magnetic stripe, smart card, electronic pointer, touchpad and/or the like, into a user computer, POS terminal, kiosk, and/or ATM terminal. The information may be transmitted via any network.

The present invention may be described herein in terms of functional block components, optional selections and/or various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and/or the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and/or the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by Mayiam Stalling, published by Prentice Hall; all of which are hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. It should be noted that many alternative or additional functional relationships or physical connections might be present in a practical transaction account distribution system.

As may be appreciated by one of ordinary skill in the art, the present invention may be embodied as a method, a data processing system, a device for data processing, a financial transaction device, and/or a computer program product. Accordingly, the present invention may take the form of an entirely software embodiment, an entirely hardware embodiment, or an embodiment combining aspects of both software and hardware or other physical devices. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

These computer program instructions may also be stored in a computer-readable memory that can direct a computer or other programmable data processing apparatus to function in a particular manner, such that the instructions stored in the computer-readable memory produce an article of manufacture including instruction means which implement functions of flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus include steps for implementing the functions specified in the flowchart block or blocks.

In the foregoing specification, the invention has been described with reference to specific embodiments. However, it may be appreciated that various modifications and changes can be made without departing from the scope of the present invention. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

The invention claimed is:

1. A method for facilitating distribution of a transaction account card through a distributor, said method comprising:
   issuing, by a computer-based system for facilitating said distribution of said transaction account card through said distributor, transaction account cards in groups to said distributor, wherein each of said transaction account cards include a different randomized transaction account code associated with a respective transaction account, and a serialized tracking code which conforms to a MICR communication protocol;
   receiving, by said computer-based system, information from said distributor via said MICR communication protocol, wherein said MICR communication protocol includes rules governing syntax, semantics, and synchronization of communication, and wherein said information includes said transaction account codes and said serialized tracking codes which indicate said transaction account cards that have been distributed by said distributer;

processing, by said computer-based system, said information via a pre-established Travelers Cheque infrastructure; and transmitting, by said computer-based system, said processed information to a non-Travelers Cheque transaction account infrastructure; and approving, by said computer-based system, of said serialized tracking code to enable a purchase of said transaction account card.

2. The method of claim 1, further comprising the step of activating said distributed transaction account card.

3. The method of claim 1, wherein a purchase agreement is associated with said transaction account card and bears indicia of said serialized tracking code.

4. The method of claim 3, wherein said indicia of said serialized tracking code is embodied in a MICR line visible on said purchase agreement form.

5. The method of claim 1, further comprising paying a third party seller a commission for said sale of said transaction account card based on at least a portion of the information received from said third party seller.

6. The method of claim 2, further comprising confirming that activation is appropriate by confirming at least one of information received from a third party distributor: a purchase location, said serialized tracking code and said transaction account code.

7. The method of claim 1, wherein said MICR communication protocol further includes at least one of message formats, a description of message formats, rules for exchanging messages, signaling, authentication, error detection, and correction capabilities.

8. A transaction account distribution device for facilitating distribution of transaction account cards by a distributor, said transaction account distribution device configured to:

facilitate issuing transaction account cards in groups to said distributor, wherein each of said transaction account cards include a different randomized transaction account code associated with a respective transaction account, and a serialized tracking code which conforms to a MICR communication protocol;

receive information from said distributor via said MICR communication protocol, wherein said MICR communication protocol includes rules governing syntax, semantics, and synchronization of communication, and wherein said information includes said transaction account codes and said serialized tracking codes which indicate said transaction account cards that have been distributed by said distributer;

process said information via a pre-established Travelers Cheque infrastructure;

transmit said processed information to a non-Travelers Cheque transaction account infrastructure; and receiving approval of said serialized tracking code to enable a purchase of said transaction account card.

9. A system for facilitating distribution of a transaction account through a third party distributor comprising:

a network interface communicating with a memory;

said memory communicating with a processor; and said processor, when executing a computer program, is configured to perform a method comprising:

facilitating issuing transaction account cards in groups to said distributor, wherein each of said transaction account cards include a different randomized transaction account code associated with a respective transaction account, and a serialized tracking code which conforms to a MICR communication protocol;

receiving information from said distributor via said MICR communication protocol, wherein said MICR communication protocol includes rules governing syntax, semantics, and synchronization of communication, and wherein said information includes said transaction account codes and said serialized tracking codes which indicate said transaction account cards that have been distributed by said distributer;

processing said information via a pre-established Travelers Cheque infrastructure;

transmitting said processed information to a non-Travelers Cheque transaction account infrastructure; and transmitting approval of said serialized tracking code to enable a purchase of said transaction account card.

10. A non-transitory, tangible computer-readable medium having stored thereon a plurality of computer-executable instructions that, if executed by a computing device, cause said computing device to perform operations comprising:

facilitating issuing transaction account cards in groups to said distributor, wherein each of said transaction account cards include a different randomized transaction account code associated with a respective transaction account, and a serialized tracking code which conforms to a MICR communication protocol;

receiving information from said distributor via said MICR communication protocol, wherein said MICR communication protocol includes rules governing syntax, semantics, and synchronization of communication, and wherein said information includes said transaction account codes and said serialized tracking codes which indicate said transaction account cards that have been distributed by said distributer;

processing said information via a pre-established Travelers Cheque infrastructure;

transmitting said processed information to a non-Travelers Cheque transaction account infrastructure; and approving of said serialized tracking code to enable a purchase of said transaction account card.

* * * * *